(12) United States Patent
Reske

(10) Patent No.: US 9,251,692 B2
(45) Date of Patent: Feb. 2, 2016

(54) GPS DIRECTED INTRUSION SYSTEM WITH DATA ACQUISITION

(71) Applicant: Honeywell International Inc., Morristown, NJ (US)

(72) Inventor: John M. Reske, Racine, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 90 days.

(21) Appl. No.: 13/833,612

(22) Filed: Mar. 15, 2013

(65) Prior Publication Data

US 2014/0266700 A1   Sep. 18, 2014

(51) Int. Cl.
| | | |
|---|---|---|
| G08B 1/08 | (2006.01) | |
| G08B 21/22 | (2006.01) | |
| G08B 25/08 | (2006.01) | |
| G08B 13/00 | (2006.01) | |
| G08B 13/196 | (2006.01) | |

(52) U.S. Cl.
CPC ............... *G08B 21/22* (2013.01); *G08B 13/00* (2013.01); *G08B 25/08* (2013.01); *G08B 13/19608* (2013.01)

(58) Field of Classification Search
CPC .................. G08B 13/19608; G08B 13/19602; G08B 13/19645; G08B 25/014; H04N 7/00; H04N 21/4223; G06F 21/55; G06K 2017/0045

USPC .......... 340/539.13, 506, 539.2, 541, 565, 5.2; 348/159, 153

See application file for complete search history.

(56) References Cited

U.S. PATENT DOCUMENTS

| | | | | |
|---|---|---|---|---|
| RE44,275 E | * | 6/2013 | Ghazarian | ................... 340/568.1 |
| 8,711,218 B2 | * | 4/2014 | Zehavi | ........................... 348/143 |
| 2004/0119819 A1 | * | 6/2004 | Aggarwal et al. | ............. 348/143 |
| 2006/0238617 A1 | * | 10/2006 | Tamir | .............................. 348/143 |
| 2007/0035627 A1 | * | 2/2007 | Cleary et al. | ................... 348/159 |
| 2007/0039030 A1 | * | 2/2007 | Romanowich et al. | ........ 725/105 |
| 2010/0013933 A1 | * | 1/2010 | Broad | ............................ 348/159 |
| 2012/0327246 A1 | * | 12/2012 | Senior et al. | ................... 348/159 |
| 2014/0040621 A1 | * | 2/2014 | Klimke | ......................... 713/171 |

* cited by examiner

*Primary Examiner* — Phung Nguyen

(74) *Attorney, Agent, or Firm* — Husch Blackwell LLP

(57) ABSTRACT

A GPS directed intrusion system with data acquisition is provided. Some methods can include detecting a threat event associated with a monitored facility, collecting data relevant to the threat event, and transmitting the data relevant to the threat event to a mobile device of an authority figure dispatched to the monitored facility. Some methods can also include placing a surveillance device associated with the monitored facility in a tracking mode, tracking motion captured by the surveillance device, and transmitting data representative of the motion to a mobile device of an authority figure dispatched to the monitored facility.

16 Claims, 3 Drawing Sheets

GPS DIRECTED INTRUSION SYSTEM WITH DATA ACQUISITION

FIELD

The present invention relates generally to intrusion systems. More particularly, the present invention relates to a GPS directed intrusion system with data acquisition.

BACKGROUND

Access control and intrusion systems are known in the art. For example, known access control and intrusion systems can provide authorized personnel with access into and out of a monitored building. At the same time, known access control and intrusion systems can monitor the building for events that indicate a possible threat event. For example, one type of a threat event includes a break-in, such as when a perpetrator illegally gains access to a monitored building. When a break-in occurs, the perpetrator often performs some unauthorized action, such as a theft or causing bodily harm to authorized personnel that are legally inside of the monitored building.

When a possible threat event is detected, known access control and intrusion systems can respond to the threat event by generating an alarm and notifying a system operator, who can determine if the threat is real. The system operator can also notify the proper authorities, for example, the police, to have an authority figure dispatched to the monitored building for assistance or to perform a further investigation regarding the threat event.

In many instances, system operators are not located on the site of a monitored building. For example, after normal business hours, a company building may be empty. Accordingly, no one will be on site to assist the authorities or to provide the authorities with any additional information that they may need when the authorities arrive at the site.

For example, when a dispatched authority figure arrives on the site of a monitored building, the authority figure will have little or no information to assist with his investigation of a detected threat event. The authority figure will likely not be familiar with the monitored building or the location to which he was dispatched. Furthermore, the authority figure will likely not know the layout of the monitored building or where to find a sensor that detected the threat event. Any or all of this lack of knowledge can place the authority figure in harm's way.

Some known access control and intrusion systems include video cameras, but often these cameras are statically mounted to a wall or ceiling of the monitored building and thus, only provide a single camera angle. Accordingly, video cameras in known access control and intrusion systems may not be able to capture enough data to determine the nature of a detected threat event or to identify a perpetrator.

In view of the above, there is a continuing, ongoing need for improved access control and intrusion systems.

DETAILED DESCRIPTION

Figure 1:
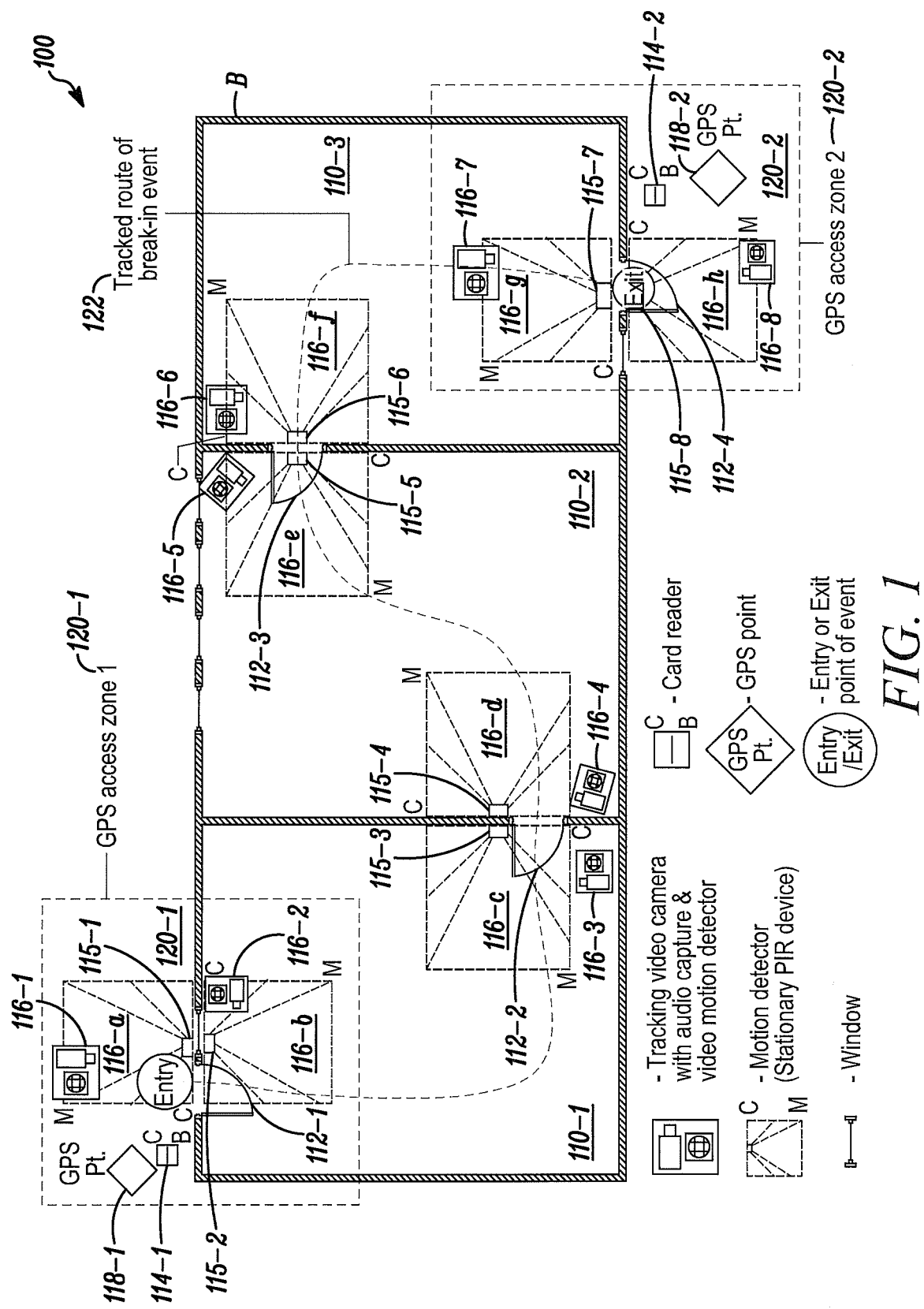
FIG. 1 is a floor plan of an intrusion system in accordance with disclosed embodiments installed in a monitored building.

While this invention is susceptible of an embodiment in many different forms, there are shown in the drawings and will be described herein in detail specific embodiments thereof with the understanding that the present disclosure is to be considered as an exemplification of the principles of the invention. It is not intended to limit the invention to the specific illustrated embodiments.

Embodiments disclosed herein include a GPS directed intrusion system with data acquisition. For example, systems and methods disclosed herein can collect relevant data and transmit collected data to authorities to aid the authorities in identifying the nature of a detected threat event and in identifying and apprehending a perpetrator.

In some embodiments, the data transmitted to the authorities can aid the authorities in arriving at the exact location and/or sensor that detected the threat event. In some embodiments, the data transmitted to the authorities can aid the authorities in tracking a perpetrator, for example, if the perpetrator is moving within the monitored building. For example, the data transmitted to the authorities can include and/or aid the authorities in determining a likely route that the perpetrator will traverse so that the authorities can be dispatched to a point where the perpetrator is likely to exit the monitored building.

According to disclosed embodiments, systems and methods disclosed herein can detect a potential threat event to a monitored building and can determine whether authorities need to be dispatched to the monitored building and/or the location of the sensor that detected the threat. Systems and methods disclosed herein can also transmit a notification to the appropriate authorities, collect data relevant to the detected threat event, and transmit collected data to the authorities, for example, to a mobile device while the authorities are in route to the monitored building. The data transmitted to the authorities can prepare the authorities for the detected threat event so that the authorities know what to expect upon arrival at the monitored building.

For example, after a threat event is detected, systems and methods disclosed herein can automatically collect event data and transmit the collected data and related GPS location data to the proper authorities, for example, when the authorities are dispatched to the monitored building. In some embodiments, systems and methods disclosed herein can also transmit the GPS location data to a GPS navigation system for use in routing the dispatched authorities to the site of the detected threat event.

In some embodiments disclosed herein, an authority figure can employ a mobile device, for example, a cellular phone, tablet computer, or a personal digital assistant, to securely interface with systems and methods disclosed herein. For example, the mobile device can include control circuitry and executable control software stored on a transitory or non-transitory computer readable medium for securely receiving data and displaying the received data on the mobile device. In some embodiments, the mobile device can temporarily access the systems and methods disclosed herein to enable an authority figure using the device to access and view additional data that cannot be viewed on the device, for example, if the amount of data is too large or when live event tracking data is needed.

After an authority figure has been dispatched, some systems and methods disclosed herein can transmit a system data key to the authority figure's mobile device. For example, the system data key can pre-enable the mobile device to receive and review system data. In some embodiments, the system data key can be temporary, that is, the data key can expire after a predetermined period of time so that the mobile device can only receive and review system data during the predetermined period of time. In this manner, system security can be maintained.

Some embodiments of the mobile device disclosed herein can include a GPS device so that the mobile device can determine its GPS coordinates relative to the monitored building to which the owner of the device has been dispatched. In these embodiments, the mobile device can use its GPS capability to determine when to activate the device's capability to receive and review system data. For example, the device's capability to receive and review system data can be enabled only when needed and/or only when the device is within a predetermined distance from the monitored site to which the owner of the device has been dispatched.

In some embodiments, the data collected and transmitted by systems and methods disclosed herein can include a plurality of different data types that can be reviewed by authorities. For example, in some embodiments, the data collected and transmitted by systems and methods disclosed herein can include the location of an event, for example, a detected threat event. Some embodiments of the intrusion system disclosed herein can include a GPS device, and systems and methods disclosed herein can tag and/or embed surveillance data with GPS data, which can be sent to the proper authorities. Systems and methods can identify GPS coordinates of the event, and authorities can use the GPS coordinates to locate the exact location of a detected threat event. For example, when a monitored site includes several buildings, knowing the building and/or location in the building where a threat event is detected can aid authorities in quickly locating and arriving at the location of the threat.

In some embodiments, the data collected and transmitted by systems and methods disclosed herein can also include video data, for example, video data streams. The video data can include video data streams from video cameras monitoring the interior of the monitored building and/or the exterior of the monitored building. For example, the video data streams can originate from video cameras monitoring the location of the detected threat. Authorities can use received video data to familiarize themselves with the monitored area and/or to identify additional information that can be determined from the video data. For example, in some embodiments, the video data can include information that can relate to the nature of the detected threat event, for example, information about how a break-in occurred, information to identify a perpetrator, information about victims, and/or information about activities of the perpetrator and/or the direction in which perpetrator is moving.

In some embodiments, the data collected and transmitted by systems and methods disclosed herein can also include audio data, for example, audio data streams. The audio data can include audio data streams from cameras and/or microphones monitoring the interior of the monitored building and/or the exterior of the monitored building. For example, the audio data streams can be from cameras and/or microphones monitoring the location of the detected threat event. Authorities can use received audio data to determine the number of individuals involved in the detected threat event, for example, the number of perpetrators and/or the number of victims or hostages. For example, authorities can review recorded voices and/or conversations between individuals involved in the detected threat event and/or review recorded background noise to determine the nature of a threat event as it progresses inside of a monitored building.

In some embodiments, the data collected and transmitted by systems and methods disclosed herein can also include sensor data, such as motion sensor data, and/or building information, such as a map or floor plan of a monitored building. For example, authorities can use received sensor data and/or building information to identify a location at which individuals may be present in the monitored building and/or to identify a direction in which a perpetrator may be moving within the monitored building. If systems and methods stop detecting motion at a particular location within the building, it may be determined that the perpetrator is at the particular location and/or is hidden near the particular location within the building.

According to disclosed embodiments, systems and methods disclosed herein can be placed in a threat or break-in mode after a potential threat event is detected. For example, when in a threat mode, systems and methods disclosed herein can track a perpetrator as he moves throughout the monitored building. Some embodiments of the intrusion system disclosed herein can include video surveillance cameras and when systems and methods disclosed herein are in the threat mode, the video cameras can be placed in a self-tracking mode and track threat activity, for example, movements of the perpetrator. Control circuitry and/or executable control software associated with the video cameras can identify motion in frames of video data streams captured by the cameras and responsive thereto, control the camera to pan, tilt, and zoom. That is, motion sensed by the video cameras can control the pan, tilt, and zoom of the cameras to automatically track event motion.

FIG. 1 is a floor plan of an intrusion system 100 in accordance with disclosed embodiments installed in a monitored building B. As seen in FIG. 1, the system 100 can be installed in a building B with a plurality of rooms, for example, 110-1, 110-2, 110-3, and each room 110-1, 110-2, 110-3 can include at least one entry/exit way, for example a door. Room 110-1 can include an entry door 112-1 to the building B and a door 112-2 to room 110-2. Similarly, room 110-2 can include the door 112-2 to room 110-1 and a door 112-3 to room 110-3. Room 110-3 can include the door 112-3 to room 110-2 and an exit door 112-4 from the building B.

In some embodiments, card readers can be associated with each of the entry/exit doors 112-1, 112-4 to the building B to maintain security in the building B. For example, as seen in FIG. 1, a card reader 114-1 can be located in the vicinity of the door 112-1, and a card reader 114-2 can be located in the vicinity of the door 112-4. Each of the card readers 114-1, 114-2 can allow authorized personnel to access and/or leave the building B and prevent unauthorized personnel from accessing the building B.

In some embodiments, motion detectors and/or surveillance cameras can be associated with each of the doors 112-1, 112-2, 112-3, 112-4 in the building B to further maintain security in the building B. For example, as seen in FIG. 1, a motion detector 115-1 and a surveillance camera 116-1 can monitor a first side of the door 112-1 and capture motion data and surveillance video/audio data, respectively, in a first region 116-a, which can include the door 112-1 and the area in the vicinity of the first side of the door 112-1. Similarly, a motion detector 115-2 and a surveillance camera 116-2 can monitor a second side of the door 112-1 and capture motion data and surveillance video/audio data, respectively, in a second region 116-b, which can include the door 112-1 and the area in the vicinity of the second side of the door 112-1. A motion detector 115-3 and a surveillance camera 116-3 can monitor a first side of the door 112-2 and capture motion data and surveillance video/audio data, respectively, in a third region 116-*c*, which can include the door 112-2 and the area in the vicinity of the first side of the door 112-2. Similarly, a motion detector 115-4 and a surveillance camera 116-4 can monitor a second side of the door 112-2 and capture motion data and surveillance video/audio data, respectively, in a fourth region 116-*d*, which can include the door 112-2 and the area in the vicinity of the second side of the door 112-2. A motion detector 115-5 and a surveillance camera 116-5 can monitor a first side of the door 112-3 and capture motion data and surveillance video/audio data, respectively, in a fifth region 116-*e*, which can include the door 112-3 and the area in the vicinity of the first side of the door 112-3. Similarly, a motion detector 115-6 and a surveillance camera 116-6 can monitor a second side of the door 112-3 and capture motion data and surveillance video/audio data, respectively, in a sixth region 116-*f*, which can include the door 112-3 and the area in the vicinity of the second side of the door 112-3. A motion detector 115-7 and a surveillance camera 116-7 can monitor a first side of the door 112-4 and capture motion data and surveillance video/audio data, respectively, in a seventh region 116-*g*, which can include the door 112-4 and the area in the vicinity of the first side of the door 112-4. Similarly, a motion detector 115-8 and a surveillance camera 116-8 can monitor a second side of the door 112-4 and capture motion data and surveillance video/audio data, respectively, in an eighth region 116-*h*, which can include the door 112-4 and the area in the vicinity of the second side of the door 112-4.

In some embodiments, each of the motion detectors 115-1, 115-2, 115-3, 115-4, 115-5, 115-6, 115-7, 115-8 can include a stationary PIR (passive infrared) sensor or device. In some embodiments, each of the surveillance cameras 116-1, 116-2, 116-3, 116-4, 116-5, 116-6, 116-7, 116-8 can include a PTZ (pan-tilt-zoom) camera.

In some embodiments, a GPS device can be associated with each of the entry/exit doors 112-1, 112-4 and/or with each of the card readers 114-1, 114-2 to further maintain security in the building B. However, it is to be understood that a GPS device can be installed in the vicinity of any door having a location that would need to be specifically identified to authorities. For example, as seen in FIG. 1, a GPS device 118-1 can be located in the vicinity of the door 112-1 and/or the reader 114-1, and a GPS device 118-2 can be located in the vicinity of the door 112-4 and/or the reader 114-2.

In some embodiments, a GPS device can be implemented with control circuitry, one or more programmable processors, and executable control software that can be stored on a transitory or non-transitory computer readable medium as would be known by those of skill in the art. In some embodiments, a GPS device can be implemented as a device or circuit embedded in a second device, for example, a card reader or sensor, that is part of the intrusion system 100 and mounted in the vicinity of a door in the building B. For example, in some embodiments, the GPS device 118-1 can be embedded in the card reader 114-1, and the GPS device 118-2 can be embedded in the card reader 114-2.

As seen in FIG. 1, an access zone can be associated with each GPS device 118-1, 118-2. For example, a first access zone 120-1 can be associated with GPS device 118-1, and a second access zone 120-2 can be associated with GPS device 118-2. In some embodiments, an access zone 120-1, 120-2 can include all devices that are associated with the respective GPS device 118-1, 118-2. For example, the first access zone 120-1 can include the door 112-2, the reader 114-1, the motion detectors 115-1, 115-2, the surveillance cameras 116-1, 116-2, and the GPS device 118-2. Similarly, the second access zone 120-2 can include the door 112-4, the reader 114-2, the motion detectors 115-7, 115-8, the surveillance cameras 116-7, 116-8, and the GPS device 118-2.

Figure 2:
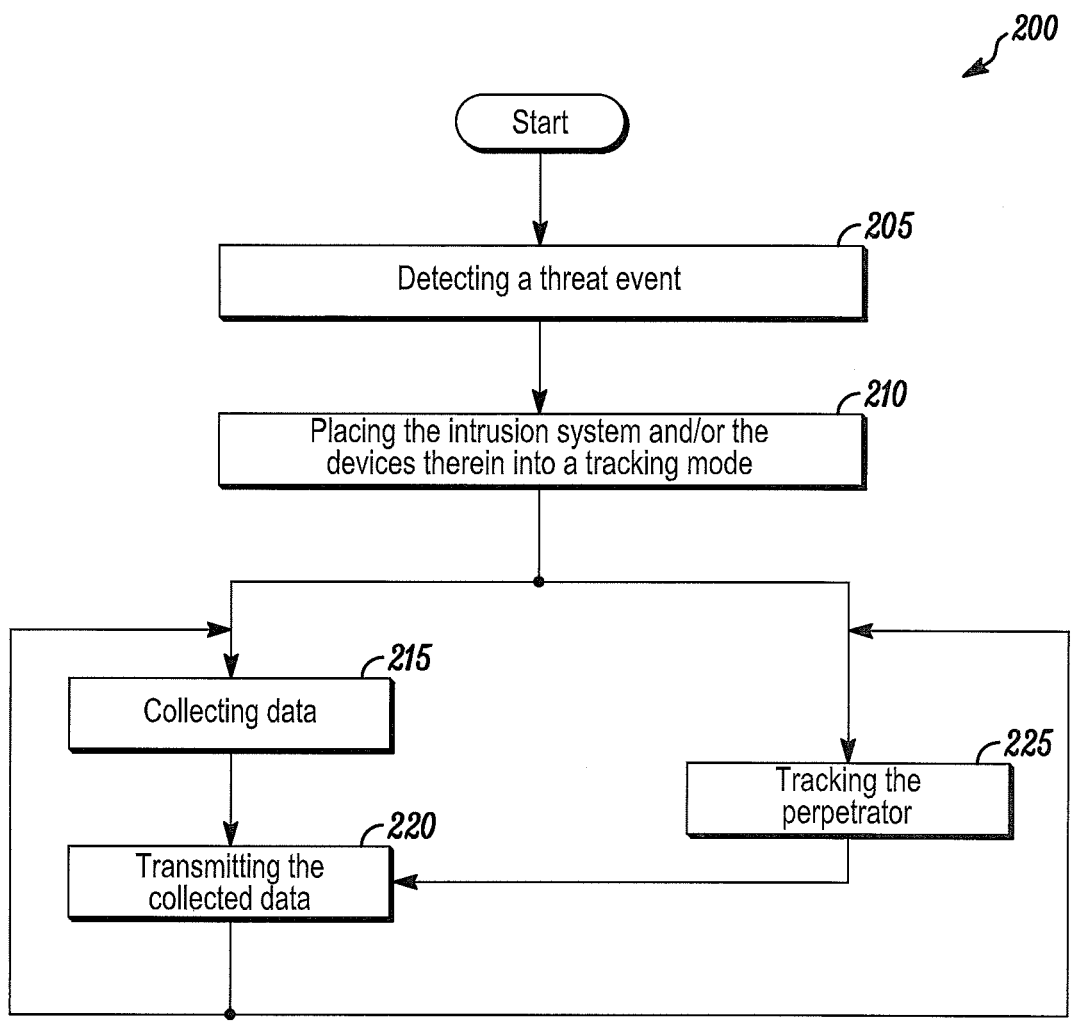
FIG. 2 is a flow diagram of a method in accordance with disclosed embodiments.

FIG. 2 is a flow diagram of a method 200 in accordance with disclosed embodiments. As seen in FIG. 2, the method 200 can include detecting a threat event as in 205. For example, the intrusion system 100 and/or devices therein can detect an unauthorized perpetrator entering and/or attempting to enter the building B. After the method 200 detects a threat event as in 205, the method 200 can include placing the intrusion system 100 and/or devices therein into a tracking mode as in 210.

Once in the tracking mode as in 210, the method 200 can include collecting data as in 215. For example, the method 200 can determine the specific location, for example, the door 112-1, at which the perpetrator entered the building B. The method 200 can also use the associated GPS device 118-1 to determine the GPS coordinates of the door 112-1 and the associated access zone 120-1. Once the access zone 120-1 is determined, the method 200 can collect data that is likely most relevant to the detected threat event. That is, the method 200 can collect data from each of the devices in and/or associated with the access zone 120-1. For example, the method 200 can collect data from the reader 114-1, from the motion detectors 115-1, 115-2, from the surveillance cameras 116-1, 116-2, and from the GPS device 118-1.

After the method 200 collects data as in 215, the method can include transmitting the collected data as in 220, for example, transmitting the collected data to dispatched authorities. For example, the method 200 can transmit the collected data to an authority figure's mobile device. In some embodiments, the method 200 can transmit building maps and floor plans with the collected data. Using the received data and/or the received building maps and/or floor plans, dispatched authorities can review data that is specific to a location of a threat event.

Once in the tracking mode as in 210, the method 200 can also include tracking the perpetrator as in 225. For example, when the method 200 places the intrusion system 100 in a tracking mode as in 210, the method 200 can also place one or more of the surveillance cameras 116-1, 116-2, 116-3, 116-4, 116-5, 116-6, 116-7, 116-8 into a tracking mode. When the surveillance cameras 116-1, 116-2, 116-3, 116-4, 116-5, 116-6, 116-7, 116-8 are in a tracking mode, the system 100 and/or the surveillance cameras 116-1, 116-2, 116-3, 116-4, 116-5, 116-6, 116-7, 116-8 themselves can control the pan, tilt, and zoom of the cameras 116-1, 116-2, 116-3, 116-4, 116-5, 116-6, 116-7, 116-8 to track the perpetrator.

For example, when the system 100 and/or a surveillance camera 116-1, 116-2, 116-3, 116-4, 116-5, 116-6, 116-7, 116-8 detects video motion within a frame of a collected video data stream, the system 100 and/or surveillance camera 116-1, 116-2, 116-3, 116-4, 116-5, 116-6, 116-7, 116-8 can determine in which direction the source of the video motion, for example, the captured perpetrator, is moving and can cause the surveillance cameras 116-1, 116-2, 116-3, 116-4, 116-5, 116-6, 116-7, 116-8 to pan, tilt, and/or zoom as needed to track the video motion.

Based on the detected video motion and the determined direction of the video motion, the system 100 and/or the surveillance cameras 116-1, 116-2, 116-3, 116-4, 116-5, 116-6, 116-7, 116-8 can determine a probable path or route 122 along which the perpetrator is travelling within the building B. Then, surveillance cameras 116-1, 116-2, 116-3, 116-4, 116-5, 116-6, 116-7, 116-8 not yet sensing video motion of the captured perpetrator can be moved to a position in which the surveillance detector 116-1, 116-2, 116-3, 116-4, 116-5, 116-6, 116-7, 116-8 will likely sense video motion of the captured perpetrator when the perpetrator moves within range and/or within a detection region of the surveillance camera 116-1, 116-2, 116-3, 116-4, 116-5, 116-6, 116-7, 116-8.

For example, when the surveillance camera 116-1 captures a perpetrator within video of the first region 116-a, the system 100 and/or the surveillance camera 116-1 can determine that the perpetrator will likely travel along the route 122. Then, the system 100 and/or the surveillance detector 116-2 can move the surveillance detector 116-2 to a position in which the surveillance detector 116-2 will likely capture video of the perpetrator when he moves into the second region 116-b. When the surveillance camera 116-2 captures the perpetrator within video of the second region 116-b, the system 100 and/or the surveillance camera 116-2 can determine that the perpetrator will likely travel along the route 122. Then, the system 100 and/or the surveillance camera 116-3 can move the surveillance camera 116-3 to a position in which the surveillance camera 116-3 will likely capture video of the perpetrator when he moves into the third region 116-c.

When the surveillance camera 116-3 captures the perpetrator within video of the third region 116-c, the system 100 and/or the surveillance camera 116-3 can determine that the perpetrator will likely travel along the route 122. Then, the system 100 and/or the surveillance camera 116-4 can move the surveillance camera 116-4 to a position in which the surveillance camera 116-4 will likely capture video of the perpetrator when he moves into the fourth region 116-d. When the surveillance camera 116-4 captures the perpetrator within video of the fourth region 116-d, the system 100 and/or the surveillance camera 116-4 can determine that the perpetrator will likely travel along the route 122. Then, the system and/or the surveillance camera 116-5 can move the surveillance camera 116-5 to a position in which the surveillance camera 116-5 will likely capture video of the perpetrator when he moves into the fifth region 116-e.

When the surveillance camera 116-5 captures the perpetrator within video of the fifth region 116-e, the system 100 and/or the surveillance camera 116-5 can determine that the perpetrator will likely travel along the route 122. Then, the system 100 and/or the surveillance camera 116-6 can move the surveillance camera 116-6 to a position in which the surveillance camera 116-6 will likely capture video of the perpetrator when he moves into the sixth region 116-f. When the surveillance camera 116-6 captures the perpetrator within video of the sixth region 116-f, the system 100 and/or the surveillance camera 116-6 can determine that the perpetrator will likely travel along the route 122. Then, the system and/or the surveillance camera 116-7 can move the surveillance camera 116-7 to a position in which the surveillance camera 116-7 will likely capture video of the perpetrator when he moves into the seventh region 116-g.

When the surveillance detector 116-7 captures video of the perpetrator within the seventh region 116-g, the system 100 and/or the surveillance camera 116-7 can determine that the perpetrator will likely travel along the route 122. Then, the system 100 and/or the surveillance camera 116-8 can move the surveillance camera 116-8 to a position in which the surveillance camera 116-8 will likely capture video of the perpetrator when he moves into the eighth region 116-h.

As seen in FIG. 2, data collected from the surveillance cameras 116-1, 116-2, 116-3, 116-4, 116-5, 116-6, 116-7, 116-8 while tracking the perpetrator as in 225 can also be transmitted as in 220, for example, transmitted to the proper authorities as in 220. Then, the method 200 can continue collecting data as in 215 and tracking the perpetrator as in 225.

Figure 3:
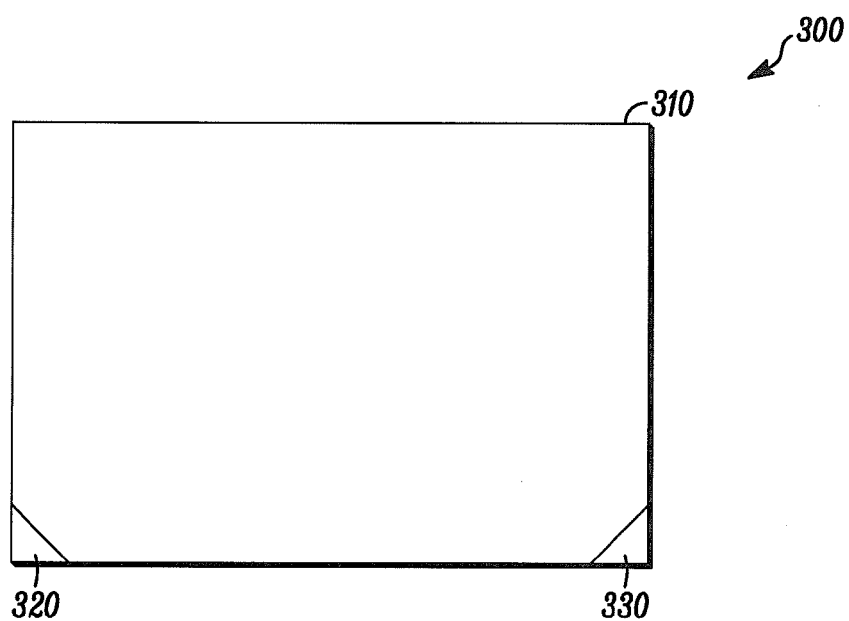
FIG. 3 is a block diagram of a system for executing the method of FIG. 1 and others in accordance with disclosed embodiments.

The method 100 of FIG. 1 and others in accordance with disclosed embodiments can be executed with the system 300 shown in FIG. 3. For example, the system 300 can include control circuitry 310, one or more programmable processors 320, and executable control software 330 stored on a transitory or non-transitory computer readable medium, including but not limited to, computer memory, RAM, optical storage media, magnetic storage media, flash memory, and the like. In some embodiments, the executable control software 330 can implement the steps of method 200 shown in FIG. 2 as well as others disclosed herein.

Figure 4:
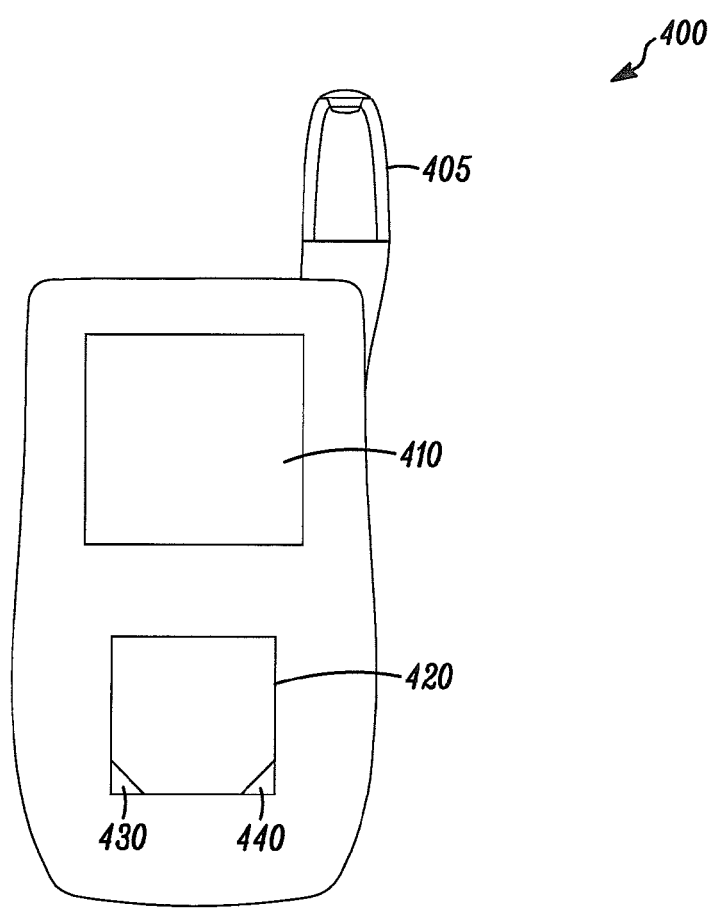
FIG. 4 is a block diagram of a mobile device for receiving data transmitted by the method of FIG. 1 and others in accordance with disclosed embodiments.

The data transmitted by the method 100 of FIG. 1 and others in accordance with disclosed embodiments can be transmitted to and received by the mobile device 400 shown in FIG. 4. For example, the mobile device 400 can include a transceiver 405, a user interface 410, for example, a viewing screen for displaying received data, control circuitry 420, one or more programmable processors 430, and executable control software 440 stored on a non-transitory computer readable medium, including but not limited to, computer memory, RAM, optical storage media, magnetic storage media, flash memory, and the like.

In some embodiments, the mobile device 400, via the transceiver 405, can receive data securely, can display data securely on the user interface 410, and/or can securely receive a system data key. In some embodiments, the mobile device 400, via the transceiver 405, can interface with the system 300, for example, when the device 400 is within a predetermined distance from the system 300 and/or from a monitored building B.

Although a few embodiments have been described in detail above, other modifications are possible. For example, the logic flows described above do not require the particular order described, or sequential order, to achieve desirable results. Other steps may be provided, or steps may be eliminated, from the described flows, and other components may be added to, or removed from, the described systems. Other embodiments may be within the scope of the invention.

From the foregoing, it will be observed that numerous variations and modifications may be effected without departing from the spirit and scope of the invention. It is to be understood that no limitation with respect to the specific system or method described herein is intended or should be inferred. It is, of course, intended to cover all such modifications as fall within the sprit and scope of the invention.

What is claimed is:

1. A method comprising:
    detecting a threat event at a first device associated with a monitored facility;
    identifying GPS coordinates of the first device and an access zone in which the first device is geographically located;
    identifying a plurality of other devices geographically located in the access zone;
    collecting data from the first device and the plurality of other devices relevant to the threat event; and
    transmitting the data relevant to the threat event to a mobile device of an authority figure dispatched to the monitored facility.

2. The method of claim 1 wherein collecting data relevant to the threat event includes identifying a location of the threat event.

3. The method of claim 2 wherein identifying a location of the threat event includes identifying GPS coordinates of a sensor that detected the threat event.

4. The method of claim 3 further comprising transmitting the GPS coordinates of the sensor that detected the threat event to a GPS navigation system.

5. The method of claim 1 further comprising transmitting a system data key to the mobile device to enable the mobile device to receive the data relevant to the threat event.

6. The method of claim 5 further comprising the system data key pre-enabling the mobile device to receive and display the data relevant to the threat event.

7. The method of claim 5 further comprising the system data key expiring after a predetermined period of time.

8. The method of claim 1 wherein collecting data relevant to the threat event includes at least one of collecting motion data from motion detectors associated with the threat event, collecting video data from surveillance devices associated with the threat event, collecting audio data from surveillance devices associated with the threat event, and collecting data from at least one sensor associated with the threat event.

9. The method of claim 1 wherein transmitting the data relevant to the threat event includes transmitting a map or a floor plan of the monitored facility to the mobile device of the authority figure dispatched to the monitored facility.

10. A method comprising:
detecting a threat event associated with a monitored facility;
placing at least one surveillance device associated with the monitored facility in a tracking mode;
tracking motion captured by the surveillance device; and
transmitting data representative of the motion to a mobile device of an authority figure dispatched to the monitored facility,
wherein tracking motion captured by the surveillance device includes projecting a probable route that a source of the motion will traverse.

11. The method of claim 10 wherein tracking motion captured by the surveillance device includes controlling a pan, tilt, and/or zoom of the surveillance device to track the motion.

12. The method of claim 10 further comprising determining a probable route of the source of the motion.

13. The method of claim 12 further comprising using the probable route to adjust a second surveillance device to sense the source of motion when the source of motion enters a motion capturing region of the second surveillance device.

14. A system comprising:
a programmable processor; and
executable control software stored on a non-transitory computer readable medium,
wherein the programmable processor and the executable control software receive an indication that a threat event at a first device associated with a monitored facility is detected,
wherein the programmable processor and the executable control software identify GPS coordinates of the first device and an access zone in which the first device is geographically located,
wherein the programmable processor and the executable control software identify a plurality of other devices geographically located in the access zone,
wherein the programmable processor and the executable control software control collection of data from the first device and the plurality of other devices relevant to the threat event, and
wherein the programmable processor and the executable control software control transmission of the data relevant to the threat event to a mobile device of an authority figure dispatched to the monitored facility.

15. The system of claim 14 further comprising at least one of a reader, a motion detector, and a surveillance device located in a vicinity of a door of the monitored facility, wherein the programmable processor and the executable control software receive the indication from the reader, the motion detector, or the surveillance device.

16. The system of claim 14 further comprising at least one GPS device located in a vicinity of a door of the monitored facility, wherein the programmable processor and the executable control software receive a location of the threat event from the GPS device.

\* \* \* \* \*